United States Patent
Chang

(10) Patent No.: US 10,083,084 B2
(45) Date of Patent: Sep. 25, 2018

(54) METHOD OF ERROR DETECTING DURING A BOOTING PROCESS, AND A COMPUTER SYSTEM FOR IMPLEMENTING THE SAME

(71) Applicant: MITAC COMPUTING TECHNOLOGY CORPORATION, Taoyuan (TW)

(72) Inventor: Ming-Hao Chang, Taoyuan (TW)

(73) Assignee: Mitac Computing Technology Corporation, Taoyuan (TW)

( * ) Notice: Subject to any disclaimer, the term of this patent is extended or adjusted under 35 U.S.C. 154(b) by 223 days.

(21) Appl. No.: 15/299,675

(22) Filed: Oct. 21, 2016

(65) Prior Publication Data
US 2017/0123923 A1    May 4, 2017

(30) Foreign Application Priority Data
Nov. 4, 2015 (TW) .............................. 104136326 A

(51) Int. Cl.
| | |
|---|---|
| G06F 11/00 | (2006.01) |
| G06F 11/14 | (2006.01) |
| G06F 11/22 | (2006.01) |
| G06F 21/57 | (2013.01) |

(52) U.S. Cl.
CPC ........ *G06F 11/142* (2013.01); *G06F 11/1417* (2013.01); *G06F 11/2247* (2013.01); *G06F 21/575* (2013.01); *G06F 2201/805* (2013.01); *G06F 2201/82* (2013.01)

(58) Field of Classification Search
CPC ............... G06F 11/1417; G06F 11/142; G06F 11/2247; G06F 11/2284; G06F 2201/805; G06F 2201/82; G06F 21/575; G06F 9/4401
See application file for complete search history.

(56) References Cited

U.S. PATENT DOCUMENTS

| | | | |
|---|---|---|---|
| 6,385,735 B1 * | 5/2002 | Wilson ...................... G06F 1/08 713/501 |
| 8,078,793 B1 | 12/2011 | Yakovlev | |
| 8,839,040 B2 * | 9/2014 | Wang ................... G06F 11/2284 714/36 |
| 8,892,861 B2 * | 11/2014 | Fischer .................... G06F 21/57 713/2 |
| 9,135,019 B2 * | 9/2015 | Chen ..................... G06F 9/4403 |
| 9,703,635 B2 * | 7/2017 | Hagiwara ............. G06F 21/572 |
| 9,842,037 B2 * | 12/2017 | Yamazaki ........... G06F 11/2289 |
| 2003/0065915 A1 * | 4/2003 | Yu ......................... G06F 9/4401 713/1 |

(Continued)

*Primary Examiner* — Marc Duncan
(74) *Attorney, Agent, or Firm* — Brinks Gilson & Lione

(57) ABSTRACT

A method of error detection during a booting process of a computer system includes: for each of setting variables of a BIOS program, determining whether or not a respective one of stored values corresponding to the setting variable is in a respective one of value ranges corresponding to the setting variable according to a variable range comparison table; and when it is determined that for at least one of the setting variables, the stored value corresponding thereto is not in the respective one of the value ranges, updating, according to a variable definition file, the at least one of the setting variables using one of preset default values corresponding to the at least one of the setting variables.

20 Claims, 4 Drawing Sheets

(56) References Cited

U.S. PATENT DOCUMENTS

2006/0020844 A1\* 1/2006 Gibbons ............. G06F 11/1417
　　　　　　　　　　　　　　　　　　　　714/2
2011/0029764 A1　 2/2011 Harmer
2015/0235029 A1\* 8/2015 Morishige ............ G06F 21/572
　　　　　　　　　　　　　　　　　　　　713/1

\* cited by examiner

METHOD OF ERROR DETECTING DURING A BOOTING PROCESS, AND A COMPUTER SYSTEM FOR IMPLEMENTING THE SAME

CROSS-REFERENCE TO RELATED APPLICATION

This application claims priority of Taiwanese Patent Application No. 104136326, filed on Nov. 4, 2015.

FIELD

The disclosure relates to a method and a system, more particularly to a method of error detection during a booting process and a computer system for implementing the method.

BACKGROUND

A computer system is operable to store a plurality of setting variables associated with booting configurations of system elements of the computer system, such as a total number of central processing units, a total number of memories and so forth. A value of each of the setting variables may be changed according to the change of settings by the user. However, when at least one of the values of the setting variables is not properly set or is tampered with by a testing tool, malicious software, a beta version Basic Input/Output System (BIOS) or a computer virus at an early stage of a booting process of the computer system, that is to say, before a user is allowed to enter a BIOS setup menu for changing the setting variables, it is impossible to know which one(s) of the setting variables has an improper value or a value that has been tampered with at the early stage of the booting process of the computer system. When the setting variables having the improper values are used for system configuration during the booting process of the computer system, malfunction or crash of the computer system may be caused.

SUMMARY

Therefore, for the purpose of preventing at least one of values of the setting variables from being tampered with by unintended means, such as a testing tool, malicious software, a beta version Basic Input/Output System (BIOS) or a computer virus, at an early stage of a booting process of a computer system, that is to say, before a user is allowed to enter a BIOS setup menu for changing the setting variables, an object of the disclosure is to provide a method of error detection during a booting process, and a computer system for implementing the same.

According to a first aspect of the disclosure, the method of error detection during a booting process is to be implemented in the computer system by executing a basic input output system (BIOS) program. The BIOS program includes a plurality of setting variables each of which is associated with the booting process, a variable definition file which stores a plurality of preset default values respectively corresponding to the setting variables, and a variable range comparison table which contains a plurality of value ranges respectively corresponding to the setting variables. The computer system includes a non-volatile memory device which stores a plurality of stored values respectively corresponding to the setting variables. The method includes the following steps of:

for each of the setting variables of the BIOS program, determining whether or not the respective one of the stored values corresponding to the setting variable is in the respective one of the value ranges corresponding to the setting variable according to the variable range comparison table; and when it is determined that for at least one of the setting variables, the respective one of the stored values corresponding thereto is not in the respective one of the value ranges, updating, according to the variable definition file, the at least one of the setting variables using a respective one of the preset default values corresponding to the at least one of the setting variables.

According to a second aspect of the disclosure, a computer system includes a processor and a non-volatile memory device coupled to the processor. The processor is operable to execute a basic input output system (BIOS) program during a booting process of the computer system. The BIOS program includes a plurality of setting variables each of which is associated with the booting process, a variable definition file which scores a plurality of preset default values respectively corresponding to the setting variables, and a variable range comparison table which contains a plurality of value ranges respectively corresponding to the setting variables. The non-volatile memory device stores a plurality of stored values respectively corresponding to the setting variables. The processor executes the BIOS program to:

for each of the setting variables of the BIOS program, determine whether or not a respective one of the stored values corresponding to the setting variable is in a respective one of the value ranges corresponding to the setting variable according to the variable range comparison table, and when it is determined that for at least one of the setting variables, the respective one of the stored values corresponding thereto is not in the respective one of the value ranges, update, according to the variable definition file, the at least one of the setting variables using one of the preset default values corresponding to the at least one of the setting variables.

An effect of the disclosure resides in that by virtue of executing the BIOS program to check the setting variables according to the variable range comparison table during the booting process of the computer system, when the stored value corresponding to one of the setting variables is not in a corresponding one of the value ranges, the stored value corresponding to the one of the setting variables is restored to its preset default value. In this way, booting configuration of the computer system may be correctly performed.

BRIEF DESCRIPTION OF THE DRAWINGS

Other features and advantages of the disclosure will become apparent in the following detailed description of embodiment(s) with reference to the accompanying drawings, of which.

DETAILED DESCRIPTION

Figure 1:
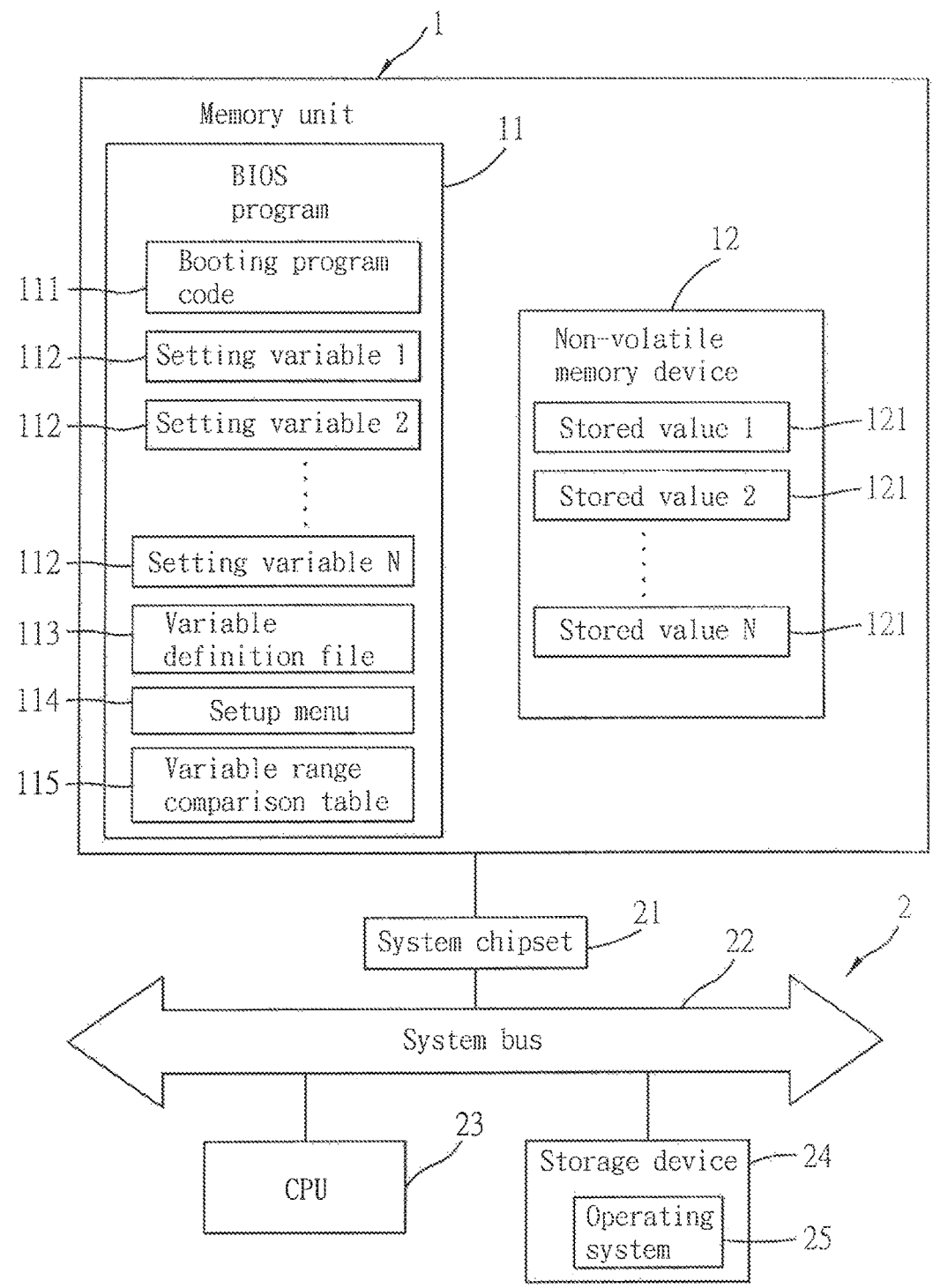
FIG. 1 is a block diagram illustrating an embodiment of a computer system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a computer system according to the disclosure includes a memory unit 1. The memory unit 1 stores a basic input output system (BIOS) program 11, and includes a non-volatile memory device 12. In this embodiment, the memory unit 1 is exemplified as a flash, read-only memory (ROM), and the non-volatile memory device 12 is exemplified as a non-volatile random access memory (NVRAM) which serves as a flash part of the flash ROM.

The computer system further includes the following system elements 2, including a system chipset 21 which is exemplified as a southbridge and which is coupled to the memory unit 1, a processor which is exemplified as a central processing unit (CPU) 23, a storage device 24 which stores an operating system 25, and a system bus 22 which interconnects the system chipset 21, the CPU 23 and the storage device 24.

Figure 2:
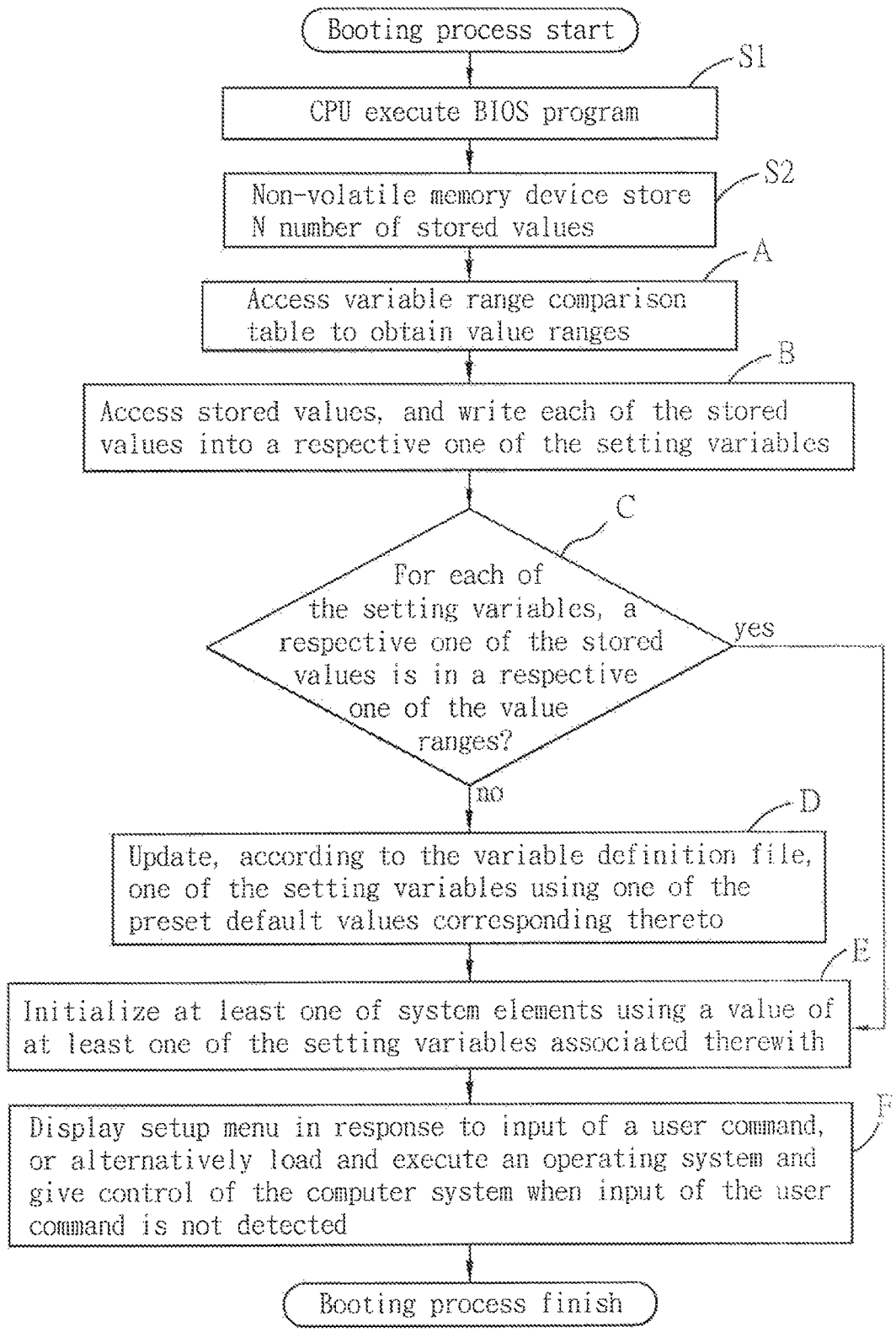
FIG. 2 is a flow chart illustrating an embodiment of a method of error detection during a booting process according to the disclosure.

Referring to FIG. 2 in combination with FIG. 1, a first embodiment of method of error detection during a booting process of a computer system according to the disclosure is to be implemented by the aforementioned computer system. The method includes the following steps.

In step S1, when the computer system is powered on, i.e., the booting process of the computer system is initiated, the CPU 23 begins to run the BIOS program by first loading from the memory unit 1 the BIOS program 11 into a main memory (not shown) electrically connected to the CPU 23 and next executing a booting program code 111 of the BIOS program 11 thus loaded. The BIOS program 11 includes the booting program code 111 which is associated with the booting process of the computer system, a plurality of (e.g., N number of) setting variables 112 each of which is to be used during the booting process, a variable definition file 113 which stores a plurality of preset default values respectively corresponding to the setting variables 112, a setups menu 114 which is displayed in response to an input of a user command and which contains the setting variables 112 for setting configurations of the computer system, and a variable range comparison table 115 which contains a plurality of value ranges respectively corresponding to the setting variables 112. Since the BIOS program 11 is loaded from the memory unit 1 into the main memory when the computer system is powered on, the variable range comparison table 115 stored in the BIOS program 11 is loaded into the main memory as well. In this embodiment, N is a natural number, and the N number of the setting variables 112 are associated with a total number of CPUs, a total number of memories, a memory format, a memory capacity or a timeout value for the booting process of the computer system by the BIOS program 11. It should be noted that the N number of setting variables 112 are not limited to the disclosure herein, and may include other setting options in practical cases.

Specifically, the method of error detection during a booting process of a computer system according to the disclosure is implemented at an early stage of the booting process (i.e., a power-on self-test (POST)), that refers to a time period starting from a time instant right after the computer system is powered on so the BIOS program 11 is initiated to a time instant before booting of hardware (i.e., the system elements 2) of the computer system is completed by the BIOS program 11. At the early stage of the booting process, which has a time span of around ten to sixty seconds, the user is not able to enter the setup menu 114 for changing values for the setting variables 112. In other words, the method of error detecting during a booting process is implemented before the user is permitted to enter the setup menu 114 of the BIOS program 11 for tweaking the setting variables 112.

Figure 3:
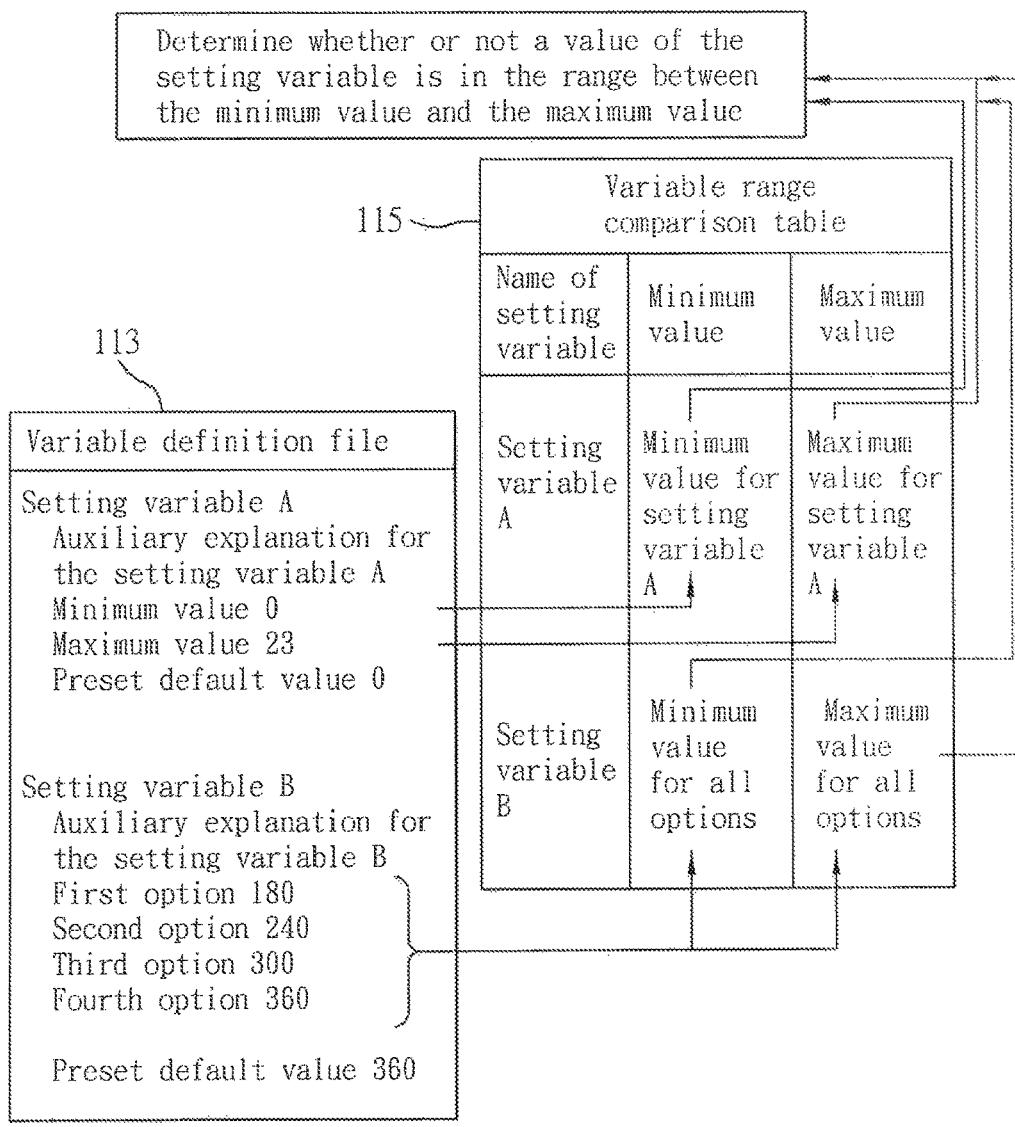
FIG. 3 is a schematic diagram illustrating an embodiment of a variable definition file and a variable range comparison table included in a BIOS program.

Referring to FIG. 3, specifically, contents stored in the variable definition file 113 may vary based on different characteristics of the setting variables 112, such that each of the setting variables 112 is provided with a distinct definition by the variable definition file 113. In one instance, for a setting variable A among the setting variables 112 which is exemplified as the time of a computer system indicated by the hours from 0 to 23 (Time: Hours), the variable definition file 113 further includes an auxiliary explanation corresponding to the setting variable A, a minimum value (e.g., 0) and a maximum value (e.g., 23) for the setting variable A, and the corresponding one of the preset default values (e.g., 0). In another instance, a setting variable B among the setting variables 112 is exemplified as a timeout value for the booting process of the computer system by executing the BIOS program 11 (e.g., Frb2Timeout), where the computer system will reboot if the computer system fails to complete the booting process within the timeout value. Aside from an auxiliary explanation corresponding to the setting variable B, the variable definition file 113 further includes values for a first option to a fourth option, respectively, corresponding to the setting variable B, and the corresponding one of the preset default values (e.g., equaling the value of the fourth option). For example, the first option has the value of 180 seconds, the second option has the value of 240 seconds, the third option has the value of 300 seconds, and the fourth option has the value of 360 seconds. In still another instance, one of the setting variables 112 is defined with a single value. For example, the one of the setting variables 112 is exemplified as a state of a timer which is used to measure a time interval of the booting process, and the one of the setting variables is defined with a value of 1 or 0 that indicates enablement or disablement of the timer (enabled/disabled).

Each of the value ranges contained in the variable range comparison table 115 and corresponding to the respective one of the setting variables 112 is generated by a program or a software tool which fetches corresponding values stored in the variable definition file 113 to serve as the value range. In this way, the variable range comparison table 115 is established. It should be noted that, in the variable range comparison table 115, each of the value ranges is defined according to the distinct definition provided to the respective one of the setting variables 112 by the variable definition file 113. Taking the aforementioned setting variable A as an example, the value range of the setting variable A is between 0 (the minimum value) and 23 (the maximum value) included in the variable definition file 113 and encompasses 0 and 23. Taking the aforementioned setting variable B as an example, the value range of the setting variable B is between 180 (the first option) and 360 (the fourth option) included in the variable definition file 113, and encompasses 180 and 360. In addition, for the one of the setting variables 112 that is defined with the single value, the value range thereof is between 0 and 1, where 0 represents disablement of the timer and 1 represents enablement of the timer.

Referring once again to FIG. 2, in step S2, the non-volatile memory device 12 stores a plurality of (e.g., N number of) stored values 121 respectively corresponding to the setting variables 112.

In step A, the CPU 23 executes the BIOS program 11 to access the variable range comparison table 115 to obtain the value ranges corresponding respectively to the setting variables 112.

In step B, the CPU 23 executes the BIOS program 11 to access the stored values 121 corresponding respectively to the setting variables 112 and stored in the non-volatile memory device 12, and to write each of the stored values 121 thus accessed into the respective one of the setting variables 112.

In step C, the CPU 23 executes the BIOS program 11 to determine, in a predetermined order of the setting variables 112, whether or not, for each of the setting variables 112, the respective one of the stored values or a value written therein is in the respective one of the value ranges corresponding to the setting variable 112 according to the variable range comparison table 115. When a result of the determination made in step C is positive, step E is performed.

When the result of the determination made in step C is negative, the flow goes to step D, where the CPU 23 executes the BIOS program 11 to update, according to the variable definition file 113, the one of the setting variables 112 using one of the preset default values corresponding to the one of the setting variables 112. In other words, the CPU 23 executes the BIOS program 11 to restore the value written in the setting variable 112 to the preset default value according to the variable definition file 113 so that the value written in the setting variable 112 is neither the out-of-range stored value or a tampered-with value.

In step E, the CPU 23 executes the BIOS program 11 to initialize at least one of the system elements 2, which has an operating status associated with at least one of the setting variables 112, using the value written in the at least one of the setting variables 112. In this way, booting of the at least one of the system elements 2 is correctly completed by the BIOS program 11.

In step F, the CPU 23 executes the BIOS program 11 to display the setup menu 114 in response to the input of a user command, or alternatively, to load the operating system 25 from the storage device 24, execute the operating system 25, and give the operating system 25 the control of the computer system when input of the user's command is not detected. Specifically, when the BIOS program 11 receives the user command (e.g., a shortcut key or key combination is inputted by the user for calling the setup menu 114), the setup menu 114 is displayed for subsequent operation. In other words, only after booting of hardware (i.e., the system elements 2) of the computer system is completed, the user is permitted to enter the setup menu 114 by inputting the user command. On the other hand, when the user command is not received by the computer system, the operating system 25 is loaded and executed, and the control of the computer system is handed over to the operating system 25.

In this way, during the booting process of the computer system, prior to entering the setup menu 114 and/or the operating system 25, the setting variables 112 are checked one by one. When, for at least one of the setting variables 112, the corresponding stored value or the value written therein is out of the corresponding value range contained in the variable range comparison table 115, the value written in the setting variable 112 is restored to the corresponding one of the preset default values. Therefore, it may be ensured that the BIOS program 11 executed by the CPU 23 reads and uses a valid value of each of the setting variables 112 for configurations of the system elements 2. For example, a valid total number of CPUs, a valid total number of memories, a valid timeout value for the booting process of the computer system by the BIOS program 11, and so forth may be utilized to ensure proper initialization of the system elements 2 and successful booting process of the computer system.

Figure 4:
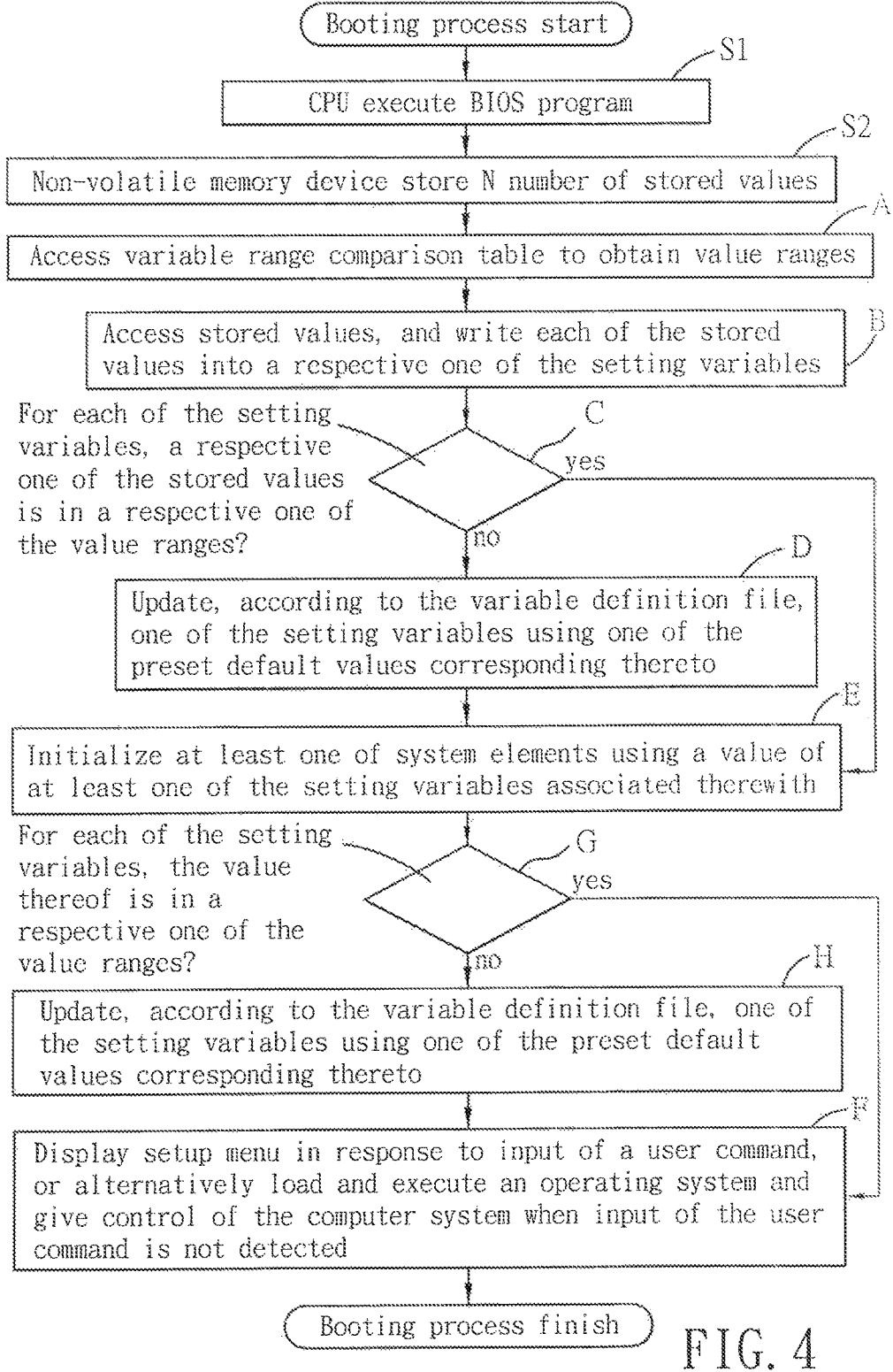
FIG. 4 is a flow chart illustrating another embodiment of the method of error detection during a booting process according to the disclosure.

Referring to FIG. 4, a second embodiment of a method of error detection during a booting process of a computer system according to this disclosure is similar to the first embodiment of the method, and differs from the first embodiment in newly added steps G and H between step E and step F.

In step G, the CPU 23 executes the BIOS program 11 to determine, in a predetermined order of the setting variables 112 of the BIOS program 11, whether or not for each of the setting variables 112, the value written in the setting variable 112 is in the respective one of the value ranges corresponding to the setting variable 112 according to the variable range comparison table 115. In this step, the value currently written in the setting variable 112 may be, for example, the stored value written into the setting variable 112 in step A, the preset default value used for restoring the setting variable 112 in step D, or a tampered-with value.

When a result of the determination made in step G is negative, the flow proceeds to step H to update, by the CPU 23 according to the variable definition file 113, the at least one of the setting variables 112 using one of the preset default values corresponding to the at least one of the setting variables 112 to make sure that the value written in each of the setting variables 112 is in the respective one of the value ranges.

In this way, after the initialization of the system elements 2 finishes in step E, the BIOS program 11 is capable of checking once again each of the setting variables 112, to determine whether the value written in the setting variable 112 is out of the corresponding value range due to an error or malfunction, thereby ensuring appropriate configuration and operation of each of the system elements 2 corresponding to the at least one of the setting variables 112 when the control of the computer system is handed over to the operating system 25. As a result, the booting process of the computer system is properly finished.

To sum up, prior to entering the setup menu 114 and/or the operating system 25, the BIOS program 11 executed by the CPU 23 is capable of checking each of the setting variables 112. When a value of at least one of the setting variables 112 is not in the corresponding value range, the value of the setting variable 112 is restored to the preset default value defined in the variable definition file 113 to ensure proper configuration of the corresponding system element 2 during the booting process and allow successful boot up.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of error detection during a booting process of a computer system, the method to be implemented by the computer system which is executing a basic input output system (BIOS) program, the BIOS program including a plurality of setting variables each of which is associated with the booting process, a variable definition file which stores a plurality of preset default values respectively corresponding to the setting variables, and a variable range comparison table which contains a plurality of value ranges respectively corresponding to the setting variables, the computer system including a non-volatile memory device which stores a plurality of stored values respectively corresponding to the setting variables, the method comprising the following steps of:
  for each of the setting variables of the BIOS program, determining whether or not the respective one of the stored values corresponding to the setting variable is in the respective one of the value ranges corresponding to the setting variable according to the variable range comparison table; and
  when it is determined that for at least one of the setting variables, the respective one of the stored values corresponding thereto is not in the respective one of the value ranges, updating, according to the variable definition file, the at least one of the setting variables using the respective one of the preset default values corresponding to the at least one of the setting variables.

2. The method of claim 1, prior to the step of determining whether or not the respective one of the stored values corresponding to the setting variable is in the respective one of the value ranges, further comprising the steps of:
  accessing the variable range comparison table to obtain the value ranges corresponding respectively to the setting variables;
  accessing the stored values corresponding respectively to the setting variables and stored in the non-volatile memory device; and
  writing each of the stored values thus accessed into the respective one of the setting variables corresponding thereto.

3. The method of claim 1, the computer system further including a system element which has an operating status associated with at least one of the setting variables, subsequent to the step of updating the at least one of the setting variables, the method further comprising the step of:
  initializing the system element using a value of the at least one of the setting variables associated with the system element.

4. The method of claim 3, wherein when it is determined that, for each of the setting variables of the BIOS program, the respective one of the stored values corresponding to the setting variable is in the respective one of the value ranges corresponding to the setting variable, the step of initializing the system element is performed.

5. The method of claim 3, the computer system further including a storage device which stores an operating system, the BIOS program further including a setup menu which contains the setting variables for setting configurations of the computer system, the method further comprising the steps of:
  displaying the setup menu in response to input of a user command; and
  loading the operating system from the storage device and giving the operating system control of the computer system when input of the user command is not detected.

6. The method of claim 3, subsequent to the step of initializing the system element, further comprising the steps of:
  for each of the setting variables of the BIOS program, determining whether or not a value of the setting variable is in the respective one of the value ranges corresponding to the setting variable according to the variable range comparison table; and
  when it is determined that the value of at least one of the setting variables is not in the respective one of the value ranges, updating, according to the variable definition file, the at least one of the setting variables using one of the preset default values corresponding to the at least one of the setting variables.

7. The method of claim 1, the variable definition file further storing a minimum value and a maximum value for each of the setting variables, wherein, in the step of determining whether or not the respective one of the stored values corresponding to the setting variable is in the respective one of the value ranges, each of the value ranges contained in the variable range comparison table is generated by fetching the minimum value and the maximum value for one of the setting variables to which the value range corresponds as stored in the variable definition file.

8. The method of claim 1, wherein, in the step of determining whether or not the respective one of the stored values corresponding to the setting variable is in the respective one of the value ranges, the setting variables are associated with at least one of a total number of central processing units, a total number of memories, a format of memory, a memory capacity or a timeout value for the booting process of the computer system by the BIOS program.

9. The method of claim 1, wherein, in the step of determining whether or not the respective one of the stored values corresponding to the setting variable is in the respective one of the value ranges, the determinations for the respective setting variables of the BIOS program are made in a predetermined order.

10. The method of claim 1, the non-volatile memory device being a non-volatile random access memory, the variable definition file further storing an auxiliary explanation for each of the setting variables.

11. A computer system comprising:
  a processor which is configured to execute a basic input output system (BIOS) program during a booting process of the computer system, the BIOS program including a plurality of setting variables each of which is associated with the booting process, a variable definition file which stores a plurality of preset default values respectively corresponding to the setting variables, and a variable range comparison table which contains a plurality of value ranges respectively corresponding to the setting variables; and
  a non-volatile memory device which is coupled to said processor and which stores a plurality of stored values respectively corresponding to the setting variables;
  wherein said processor executes the BIOS program to
    for each of the setting variables of the BIOS program, determine whether or not the respective one of the stored values corresponding to the setting variable is in the respective one of the value ranges corresponding to the setting variable according to the variable range comparison table, and
    when it is determined that for at least one of the setting variables, the respective one of the stored values corresponding thereto is not in the respective one of the value ranges, update, according to the variable definition file, the at least one of the setting variables using the respective one of the preset default values corresponding to the at least one of the setting variables.

12. The computer system of claim 11, wherein said processor executes the BIOS program to further:
  access the variable range comparison table to obtain the value ranges corresponding respectively to the setting variables;
  access the stored values corresponding respectively to the setting variables and stored in said non-volatile memory device; and write each of the stored values thus accessed into the respective one of the setting variables corresponding thereto.

13. The computer system of claim 11, further comprising a system element which has an operating status associated with at least one of the setting variables, wherein said processor executes the BIOS program to further:

initialize said system element using a value of the at least one of the setting variables associated with said system element.

14. The computer system of claim 13, wherein said processor executes the BIOS program to further initialize said system element when it is determined that, for each of the setting variables of the BIOS program, the respective one of the stored values corresponding to the setting variable is in the respective one of the value ranges corresponding to the setting variable.

15. The computer system of claim 13, further comprising a storage device which stores an operating system, wherein the BIOS program further includes a setup menu which contains the setting variables for setting configurations of the computer system, and said processor executes the BIOS program to further:

display the setup menu in response to input of a user command; and load the operating system from said storage device and give the operating system control of the computer system when input of the user command is not detected.

16. The computer system of claim 13, wherein said processor executes the BIOS program to further:

for each of the setting variables of the BIOS program, determine whether or not a value of the setting variable is in the respective one of the value ranges corresponding to the setting variable according to the variable range comparison table; and when it is determined that the value of at least one of the setting variables is not in the respective one of the value ranges, update, according to the variable definition file, the at least one of the setting variables using one of the preset default values corresponding to the at least one of the setting variables.

17. The computer system of claim 11, wherein the variable definition file further stores a minimum value and a maximum value for each of the setting variables, and each of the value ranges contained in the variable range comparison table is generated by fetching the minimum value and the maximum value for one of the setting variables to which the value range corresponds as stored in the variable definition file.

18. The computer system of claim 11, wherein the setting variables are associated with at least one of a total number of central processing units, a total number of memories, a memory format, a memory capacity, or a timeout value for the booting process of the computer system by the BIOS program.

19. The computer system of claim 11, wherein the determinations for the respective setting variables of the BIOS program are made in a predetermined order.

20. The computer system of claim 11, wherein said non-volatile memory device is a non-volatile random access memory, and the variable definition file further stores an auxiliary explanation for each of the setting variables.

* * * * *